April 6, 1943.  E. F. W. ALEXANDERSON  2,315,489
ELECTRIC DRIVE

Filed April 1, 1942

Inventor:
Ernst F. W. Alexanderson,
by Harry E. Dunham
His Attorney.

Patented Apr. 6, 1943

2,315,489

UNITED STATES PATENT OFFICE 2,315,489

ELECTRIC DRIVE

Ernst F. W. Alexanderson, Schenectady, N. Y., assignor to General Electric Company, a corporation of New York Application April 1, 1942, Serial No. 437,237

8 Claims. (Cl. 290—4)

My invention relates to electric drives and more particularly to improvements in the control of multiple unit power plant electric drives.

In my copending application, Serial No. 366,322, filed June 6, 1940, and assigned to the same assignee as this application, I have disclosed and claimed an arrangement for automatically controlling each unit of a multiple unit power plant electric drive so as to effect the automatic synchronization of the generators thereof and the proper division of load between them. In the specific embodiment of my invention disclosed in the aforesaid application, I use direct current pilot machines respectively driven by the several units and connected to a common bus so that any difference in speed between the units results in a current exchange between the respective pilot machines that is used to effect the desired control. This prior arrangement has the advantage that the pilot machines function and control the multiple units even if the generators are not excited so that the prime movers may be brought to nearly equal speed before excitation is applied to the generators.

One object of my present invention is to provide an electric drive of the type disclosed in the aforesaid patent application which is more sensitive and which eliminates the direct current bus and wiring required in the prior arrangement, thereby resulting in a cheaper and less complicated arrangement of apparatus.

In accordance with my present invention, I employ pilot machines of the synchronous type having both the field and armature members thereof free to rotate. The armature members of these pilot machines are energized from the main bus of the plant and one of the members of each machine is driven by a separate unit of the power plant so that the other member of the machine rotates at a speed proportional to the slip frequency when the respective generator is out of step with the other generators and remains stationary when the respective generator is in synchronism. The rotation and position of these other members of the pilot machines are used to effect the desired control of the associated units so as to effect the synchronization of the generators and the proper load division between them when they are operating in synchronism.

My invention will be better understood from the following description when taken in connection with the accompanying drawing, and its scope will be pointed out in the appended claims.

Figure 1:
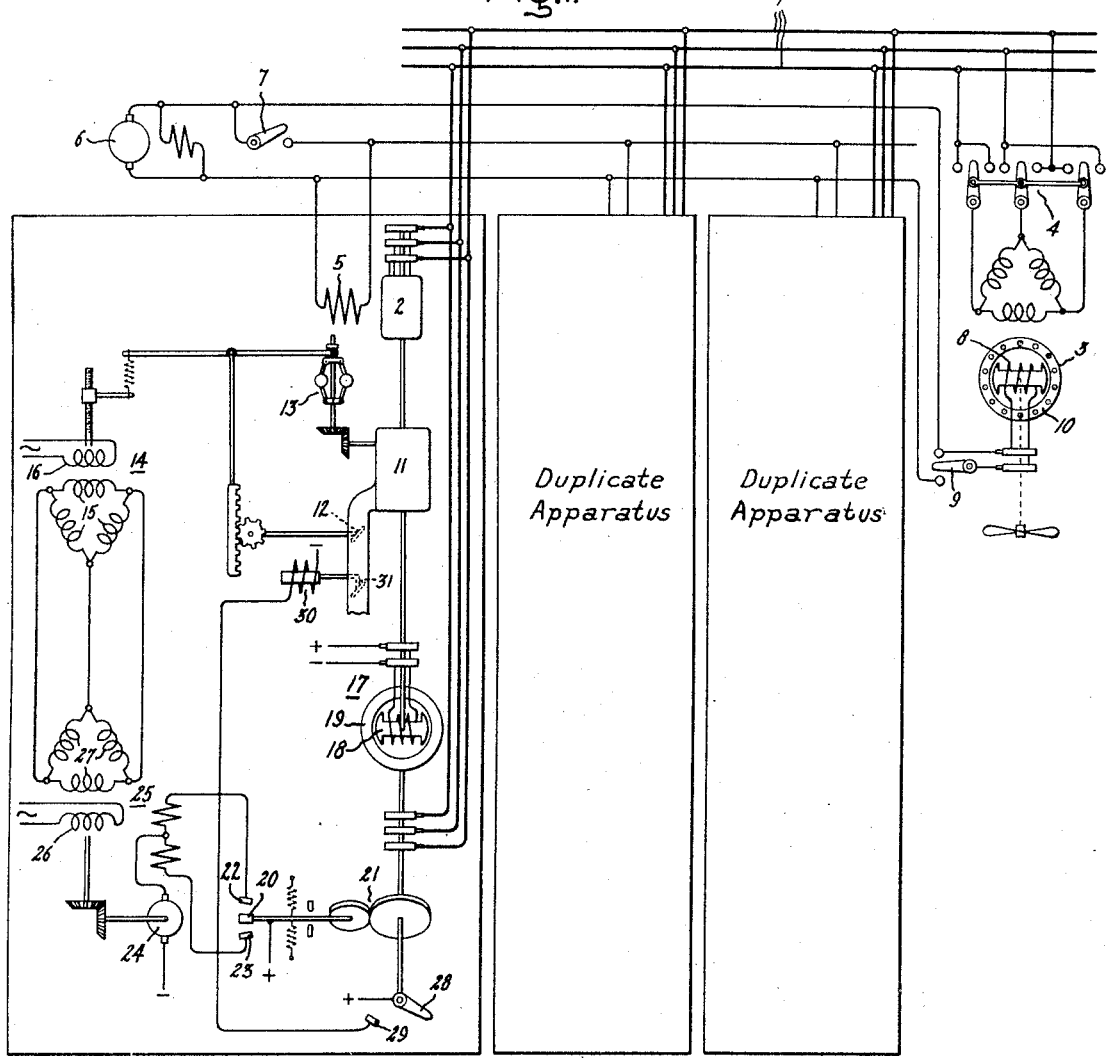
Figure 2:
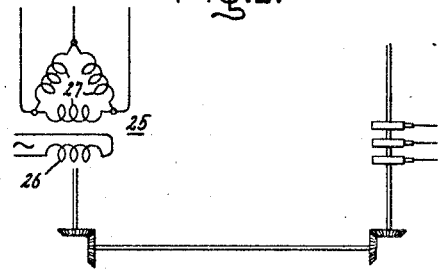

In the drawing, Fig. 1 is a diagrammatic illustration of a multiple unit power plant electric drive embodying my invention, and Fig. 2 is a modification of the embodiment shown in Fig. 1.

In the multiple unit power plant electric drive shown in Fig. 1, I have shown a main polyphase power circuit 1 across which are connected a plurality of synchronous generators 2 and a synchronous motor 3. A suitable reversing switch 4 is provided for selectively reversing the phase rotation of the motor 3.

In order to simplify the drawing and to avoid mere duplication, I have diagrammatically shown one of the generators 2 and its driving and individual control equipment in detail within a rectangle and have merely represented the other similar generators and their respective driving and individual control equipments by similar rectangles labeled "duplicate apparatus."

Each of the synchronous generators 2 is provided with a direct current field winding 5 which is energized from a suitable source of direct current, such, for example, as a common shunt exciter 6. A suitable switch 7 is provided for selectively controlling the connection of all of the generator field windings 5 to the shunt exciter 6. The synchronous motor 3 is also provided with a direct current winding 8 which is arranged to be connected to the exciter 6 by a suitable switch 9. The synchronous motor 3 is also shown as having a squirrel cage winding 10.

The generators 2 are separately driven by suitable prime movers 11, such, for example, as Diesel engines. Each prime mover 11 has a throttle 12 which is controlled by a speed governor 13. The setting of each governor 13 is arranged to be adjusted by a separate reversible synchronizing motor 14, shown as a three-phase synchronous motor having a three-phase stator winding 15 and a field winding 16 on its rotor.

The automatic means for controlling the synchronizing of and the division of load between the generators 2 includes the pilot synchronous motors 17, respectively driven at speeds proportional to the generators 2. As shown, each pilot machine has its rotor 18, on which is wound the field winding of the machine, directly driven by the associated prime mover 11 and has its stator 19, on which is wound the polyphase armature winding of the machine, mounted in any suitable manner, examples of which are well known in the art, so that it is free to rotate. The polyphase armature winding of each pilot synchronous machine 17 is connected across the main power circuit 1 so that each stator rotates at a speed proportional to the slip frequency when the associated generator 2 is out of step but remains stationary when the associated generator is in synchronism with the other generators of the plant. With such an arrangement, each stator member 19 rotates in the same direction as the associated generator 2 when the frequency of the generator is higher than the frequency of the power circuit 1 and rotates in the opposite direction with respect to the associated generator when the frequency of the associated generator is lower than the frequency of the power circuit 1. In accordance with my invention, the direction of rotation of each stator 19 is employed as a means of controlling the setting of the associated governor 13 so that the driving torque of the associated prime mover 11 is decreased when the stator rotates in the same direction that the associated generator 2 is rotating, and the driving torque is increased when the stator 19 rotates in the opposite direction. The means by which the direction of rotation of a stator 19 selectively controls the operation of the associated governing means 13 may be worked out in a number of ways. In the particular arrangement shown in Fig. 1, each stator 19 is arranged to operate a movable contact 20 by means of a suitable friction clutch arrangement 21 so that when the stator 19 is rotating in one direction, the movable contact 20 is held in engagement with a stationary contact 22 and when the stator 19 is rotating in the opposite direction, the movable contact 20 is held in engagement with the stationary contact 23. Each set of contacts 20, 22, and 23 controls an associated reversible motor 24 which in turn drives the rotor of an associated three-phase machine 25, the rotor 26 of which is connected to a suitable source of current and the three-phase stator winding 27 of which is electrically connected to the three-phase stator winding 15 of the associated synchronous machine 14.

When a generator 2 is in synchronism, the stator 19 of the associated pilot machine 17 is stationary, but its position changes with the load in such a way that it is an indication of the angular displacement that occurs between the generator rotor and the line voltage as the load varies. This angular displacement is commonly known as the displacement angle. There is an extreme displacement angle which, if exceeded, results in the generator falling out of step. In order to decrease the torque of the associated prime mover 11 before the displacement angle reaches this pull-out value, however, each rotor 18 when it approaches this pull-out angle closes the contacts 28 and 29, which are in an energizing circuit of a control magnet 30. The magnet 30, when energized, effects in any suitable manner a quick decrease in the displacement angle so as to prevent the generator from falling out of step. In the particular arrangement shown in the drawing, the magnet 30, when energized, is arranged to operate a shut-off valve 31 in the fuel supply to the associated prime mover 11.

The operation of the control arrangement shown in Fig. 1 can best be described by discussing how the arrangement operates when the load on the motor 3 is suddenly increased a relatively large amount at a time when the field excitations of the motor 3 and generators 2 are so adjusted that the maximum synchronizing torque is only slightly greater than that required to drive the load connected to the motor 3. The increased motor load causes the load on each of the power units of the plant to increase so that its speed tends to decrease. Consequently, each speed governor 13 operates to increase the output of the associated unit so as to maintain all of the units at the desired speed. Therefore, if the increased motor load does not result in a total motor load in excess of the maximum torque of the prime movers 11, the governors 13 will increase the prime mover torque sufficiently to carry the increased motor load at the desired speed. If, however, the maximum torque of the prime movers is exceeded, the system then settles down to work at a reduced speed at the maximum prime mover torque.

If the maximum torque of all of the prime movers were alike and if the adjustment of all of the governors were perfect, the increase in the load would be equally divided between the power units. However, if the adjustments are not perfect, the chances are that one or more of the prime movers will tend to carry more than its proper share of the increase in load so that its associated generator may exceed its synchronizing torque.

Whenever an increase in the displacement angle of a generator 2 is taking place during this period of increasing load, the rotor 18 of the associated pilot machine 17 is rotated in a direction to cause engagement of the associated contacts 20 and 23 so that the associated governor 13 is momentarily adjusted to decrease the torque of the associated prime mover 11. The generator 21 having the greatest tendency to become overloaded, has the most rapid change in its displacement angle, and, therefore, has a greater corrective effect upon its prime mover than any of the other generators. Consequently, the prime mover torques tend to equalize during the period of increasing load.

Similarly, a decrease in the motor load causes a momentary increase in the speed of each prime mover 11 so that the associated speed governor 13 operates to decrease the output of the associated generator and the displacement angle thereof. While the displacement angle is decreasing the rotor 18 of the associated pilot machine 17 is rotated in a direction to effect engagement of the associated contacts 20 and 22 so that the associated governor 13 is momentarily adjusted to increase the torque of the associated prime mover 11. The prime mover torques tend to equalize during a period of decreasing load in the same manner as during a period of increasing load.

If, however, in spite of the equalizing operation of the prime mover torques, the displacement angle of any one of the generators reaches a predetermined value near its pull-out value, the associated movable contact 28 engages the contact 29 and completes an energizing circuit for the associated control magnet 30 so as to effect a quick decrease in the torque of the associated prime mover 11 in order to prevent the associated generator from falling out of step. If, in spite of the energization of the magnet 30, the associated unit falls out of step, the associated pilot machine 17 indicates this fact by the rotation of the stator 19, which in turn by maintaining the associated contacts 20 and 23 in engagement effects the operation of the associated governor 13 to decrease the torque of the associated prime mover 11 until the generator 2 is again in step with the rest of the generators. Therefore, it is evident that the momentary out-of-step operation of any one of the generators does not affect operation of the whole system.

It will be obvious that the stators 19 may be arranged to drive the rotors 26 of the associated synchronous machines 25 directly, as shown in Fig. 2, instead of indirectly by means of a reversible motor 24 in the manner shown in Fig. 1.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a plurality of prime movers, a plurality of parallel connected synchronous generators respectively driven by said prime movers, rotatable means respectively associated with said generators, means for controlling each rotatable means so that the position thereof is a direct indication of the displacement angle of the associated generator, and governing means for each prime mover respectively responsive to movement of the associated rotatable means.

2. In combination, a plurality of prime movers, a plurality of parallel connected synchronous generators respectively driven by said prime movers, rotatable means respectively associated with said generators, means for controlling each rotatable means so that the position thereof is a direct indication of the displacement angle of the associated generator, and means for controlling each prime mover in accordance with the position of said rotatable means.

3. In combination, a plurality of prime movers, a plurality of parallel connected synchronous generators respectively driven by said prime movers, rotatable means respectively associated with said generators, means for controlling each rotatable means so that the position thereof is a direct indication of the displacement angle of the associated generator, and means for effecting a relatively slow change in the torque of each prime mover in response to movement of the associated rotatable means and a relatively quick change in the torque in response to a predetermined position of the associated rotatable means.

4. In combination, an energized alternating current circuit, a synchronous generator connected to said circuit, a prime mover driving said generator, a pilot dynamo electric machine having its rotor driven at a speed proportional to the speed of said generator and its stator mounted so as to be free to rotate, means for energizing said rotor and stator so that the position of said stator varies in accordance with the displacement angle of said generator, and means responsive to movement of said stator for regulating the output of said generator.

5. In combination, an energized alternating current circuit, a synchronous generator connected to said circuit, a prime mover driving said generator, a pilot dynamo electric machine having its rotor driven at a speed proportional to the speed of said generator and its stator mounted so as to be free to rotate, means for energizing said rotor and stator so that the position of said stator varies in accordance with the displacement angle of said generator, and means responsive to movement of said stator in one direction for effecting an increase in the speed of said prime mover and in the opposite direction for effecting a decrease in the speed of said prime mover.

6. In combination, an energized alternating current circuit, a synchronous generator connected to said circuit, a prime mover driving said generator, a pilot dynamo electric machine having its rotor driven at a speed proportional to the speed of said generator and its stator mounted so as to be free to rotate, means for energizing said rotor and stator so that the position of said stator varies in accordance with the displacement angle of said generator, means responsive to movement of said stator in one direction for effecting a relatively slow increase in the torque of said prime mover when the frequency of said generator is below the frequency of said circuit and in the opposite direction for effecting a relatively slow decrease in the torque of said prime mover when the frequency of said generator is above the frequency of said circuit, and means for effecting a relatively quick decrease in the torque of said prime mover when the position of said stator corresponds to a predetermined displacement angle of said generator.

7. In combination, a polyphase power circuit, a plurality of prime movers, a plurality of synchronous generators connected in parallel across said circuit and driven respectively by said prime movers, a plurality of pilot dynamo-electric machines, each pilot machine being so constructed that both its rotor and stator members are free to rotate, a polyphase winding on one of said members of each pilot machine energized from said power circuit, an energized field winding on the other member of each pilot machine, means for driving one of the members of said pilot machines respectively by said prime movers, and governing means for effecting a relatively slow change in the speed of each prime mover in response to the relative rotation of the members of the associated pilot machine and a relatively quick change in response to a predetermined relative position of the members of the associated pilot machine.

8. In combination, a polyphase power circuit, a plurality of prime movers, a plurality of synchronous generators connected in parallel across said circuit and driven respectively by said prime movers, a plurality of pilot dynamo-electric machines, each pilot machine being so constructed that both its rotor and stator members are free to rotate, a polyphase winding on one of said members of each pilot machine energized from said power circuit, an energized field winding on the other member of each pilot machine, means for driving one of the members of said pilot machines respectively by said prime movers, governing means for each prime mover, means responsive to rotation of the stator of a pilot machine when the frequency of the associated generator exceeds the frequency of said power circuit for operating said governing means to effect a relatively slow decrease in the torque of the associated prime mover, means responsive to rotation of the stator of a pilot machine when the frequency of the associated generator is below the frequency of said power circuit for operating said governing means to effect a relatively slow increase in the torque of the associated prime mover, and means responsive to a predetermined relative position of the rotor and stator of a pilot machine for effecting a relatively quick decrease in the torque of the associated prime mover.

ERNST F. W. ALEXANDERSON.